United States Patent
Jin

(10) Patent No.: US 8,542,762 B2
(45) Date of Patent: Sep. 24, 2013

(54) BI-DIRECTIONAL BEAMFORMING MULTIPLE-INPUT MULTIPLE-OUTPUT WIRELESS COMMUNICATION

(75) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 12/250,056

(22) Filed: Oct. 13, 2008

(65) Prior Publication Data

US 2009/0116569 A1    May 7, 2009

Related U.S. Application Data

(60) Provisional application No. 60/985,405, filed on Nov. 5, 2007.

(51) Int. Cl.
*H04B 7/02*    (2006.01)
(52) U.S. Cl.
USPC ........... 375/267; 375/259; 375/260; 375/299; 455/69; 455/88; 455/24; 455/101
(58) Field of Classification Search
USPC .................. 375/267, 259, 260, 299; 455/69, 455/88, 24, 101
See application file for complete search history.

(56) References Cited

U.S. PATENT DOCUMENTS

| | | | |
|---|---|---|---|
| 6,347,234 B1 * | 2/2002 | Scherzer | 455/562.1 |
| 6,980,527 B1 | 12/2005 | Liu et al. | |
| 7,099,678 B2 | 8/2006 | Vaidyanathan | |
| 7,194,237 B2 | 3/2007 | Sugar et al. | |
| 7,787,554 B1 * | 8/2010 | Nabar et al. | 375/267 |
| 2001/0038356 A1 * | 11/2001 | Frank | 343/853 |
| 2003/0133426 A1 * | 7/2003 | Schein et al. | 370/337 |
| 2006/0292990 A1 * | 12/2006 | Karabinis et al. | 455/63.4 |
| 2007/0155314 A1 * | 7/2007 | Mohebbi | 455/11.1 |
| 2007/0191043 A1 * | 8/2007 | Shapira et al. | 455/522 |
| 2007/0230595 A1 * | 10/2007 | Waxman | 375/260 |

FOREIGN PATENT DOCUMENTS

| | | |
|---|---|---|
| EP | 1191706 A2 | 3/2002 |
| WO | 2006026890 A1 | 3/2006 |

OTHER PUBLICATIONS

Liang, Ying-Chang et al., "FDD DS-CDMA Downlink Beamforming by Modifying Uplink Beamforming Weights," Vehicular Technology Conference, 2000. IEEE VTS Fall VTC 2000. 52nd Sep. 24-28, 2000, Piscataway, NY, USA, IEEE, vol. 1, Sep. 24, 2000, pp. 170-174.
International Search Report and Written Opinion dated Feb. 26, 2009 cited in PCT/US2008/082204.

* cited by examiner

*Primary Examiner* — Leila Malek

(74) *Attorney, Agent, or Firm* — Edell, Shapiro & Finnan, LLC

(57) ABSTRACT

Techniques are provided herein to configure first and second wireless communication devices in order to perform bi-directional beamformed multiple-input multiple-output (MIMO) communication. Each device uses received signals from the other device to compute beamforming weight vectors for application to a plurality of signal streams to be simultaneously beamformed transmitted to the other device.

18 Claims, 7 Drawing Sheets

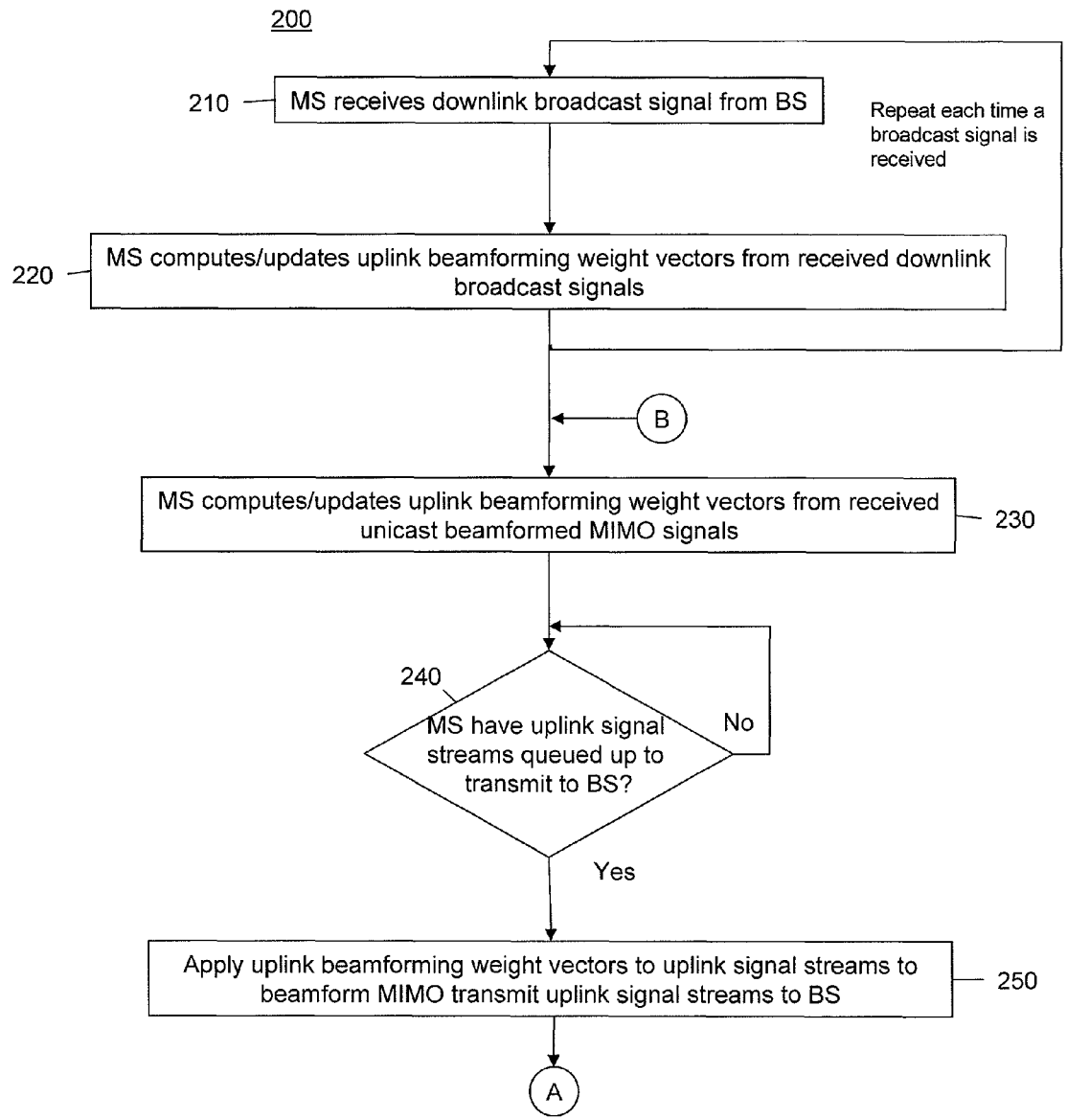

US 8,542,762 B2

BI-DIRECTIONAL BEAMFORMING MULTIPLE-INPUT MULTIPLE-OUTPUT WIRELESS COMMUNICATION

CROSS REFERENCE TO RELATED APPLICATION

This application claims priority to U.S. Provisional Application No. 60/985,405, filed Nov. 5, 2007, the entirety of which is incorporated herein by reference.

TECHNICAL FIELD

The present disclosure relates to wireless communication technology and particularly to multiple-input multiple-output (MIMO) wireless communication systems.

BACKGROUND

MIMO wireless communication systems comprise multiple-antenna wireless communication devices on both ends of a communication link, e.g., at a base station (BS) and a mobile station (MS). MIMO wireless communication techniques can enhance the radio link reliability and increase the system capacity through diversity gain and multiple signal stream transmission.

Conventional beamforming MIMO systems are unidirectional in that beamforming of multiple streams occurs in one direction from a first device, e.g., a BS, to a second device, e.g., an MS, but not in the other direction from the second device to the first device. It is desirable to exploit the knowledge that can be gained about the channel in both directions between two devices in order to perform bidirectional beamforming MIMO communication between the two devices.

BRIEF DESCRIPTION OF THE DRAWINGS

FIG. 8 is an example of a flow chart depicting the uplink beamforming MIMO weight vector computation process employed by the second communication device.

DESCRIPTION OF EXAMPLE EMBODIMENTS

Overview

Techniques are provided herein to configure first and second wireless communication devices in order to perform bi-directional beamformed multiple-input multiple-output (MIMO) communication. Each device uses received signals from the other device to compute beamforming weight vectors for application to a plurality of signal streams to be simultaneously beamformed transmitted to the other device.

The first device comprises a first plurality of antennas and the second device comprises a second plurality of antennas. The number of antennas at the first and second device may not be the same. The first device receives at the first plurality of antennas a plurality of uplink signal streams that were beamformed from the second device to the first device. The first device computes a plurality of downlink beamforming weight vectors from signals resulting from reception at the first plurality of antennas of the plurality of signal streams beamformed by the second device. The first device then applies the plurality of downlink beamforming weight vectors to a plurality of downlink signal streams for simultaneous beamform transmission via the first plurality of antennas of the first device to the second device. The second device receives at the second plurality of antennas the plurality of downlink signal streams that were beamformed by the first device to the second device. The second device computes a plurality of uplink beamforming weight vectors from signals resulting from reception at the second plurality of antennas of the plurality of downlink signal streams beamformed by the first device. The second device then applies the plurality of uplink beamforming weight vectors to a plurality of uplink signal streams for simultaneous beamform transmission via the second plurality of antennas of the second device to the first device.

Figure 1:
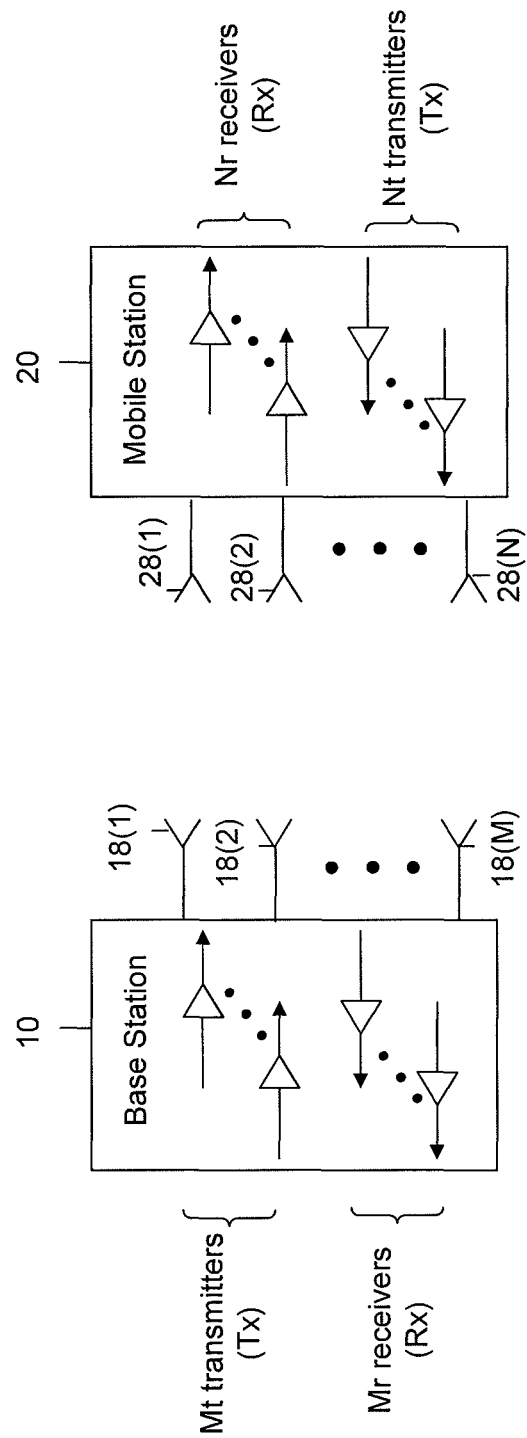
FIG. 1 is an example of a wireless communication system that performs bidirectional beamforming MIMO communication between first and second wireless communication devices.

Referring first to FIG. 1, an example of a wireless communication system is shown generally at 5 and comprises a first wireless communication device 10 and a second wireless communication device 20. The first device 10 is, for example, a base station (BS) and the second device 20 is, for example, a mobile station (MS). The BS 10 may connect to other wired data network facilities (not shown) and in that sense serves as a gateway or access point through which a plurality of MS's have access to those data network facilities. For purposes of an example described herein, the BS 10 is communicating with MS 20 and other MS's are not shown in FIG. 1 for simplicity. However, it should be understood that the BS 10 may perform the bi-directional beamforming MIMO communication techniques described herein with each of a plurality of MS's.

The BS 10 comprises a plurality of antennas 18(1)-18(M) and the MS 20 comprises a plurality of antennas 28(1)-28(N). The BS 10 may wirelessly communicate with the MS 20 using a wideband wireless communication protocol in which the bandwidth is much larger than the coherent frequency bandwidth. An example of such a wireless communication protocol is the IEEE 802.16 communication standard, also known commercially as WiMAX™. Another example of a wireless communication protocols is the IEEE 802.11 communication standard, also know commercially as WiFi™.

FIG. 1 shows a bi-directional beamformed MIMO wireless communication link between the BS 10 and the MS 20. The bi-directional beamformed MIMO communication link can be logically divided into two unidirectional beamformed MIMO links overlaid on each other. The first unidirectional beamformed MIMO link is from the BS 10 to the MS 20, and is referred to herein as a downlink beamformed MIMO path or direction. The second beamformed MIMO link is from the MS 20 to the BS 10 and is referred to herein as the uplink beamformed MIMO path or direction. The two unidirectional beamformed MIMO links may be on the same frequency channel via time division duplex (TDD) techniques or different frequency channels via frequency division duplex (FDD) techniques. The operations of two unidirectional beamformed MIMO paths (BS to MS and MS to BS) are dependent on each other for channel sounding from which the beamforming weight vectors are computed on both sides of the link.

The BS 10 may comprise a plurality (Mt) of transmitters and a plurality (Mr) of receivers. Similarly, the MS may comprise a plurality (Nt) of transmitters and a plurality (Nr) of receivers. The downlink path is from the Mt transmitters of the BS 10 to the Nr receivers of the MS 20. The uplink path is from the Nt transmitters of the MS 20 to the Mr receivers of the BS 10.

The M antennas 18(1)-18(M) of the BS 10 can be shared between the Mt transmitters and Mr receivers in TDD or FDD manner. Without loss of generality, M=max(Mt, Mr), and the antennas used by Mt transmitters will be a subset of Mr antennas used by the Mr receivers if Mt<=Mr, and vice versa. No antennas are unused.

Similarly, the N antennas 28(1)-28(N) of the MS 20 can be shared between the Nt transmitters and Nr receivers in a TDD or FDD manner. The number of antennas N=max(Nt, Nr), and the antennas used by the Nt transmitters will be a subset of Nr antennas used by the Nr receivers if Nt<=Nr, and vice versa. No antennas are unused.

Figure 2:
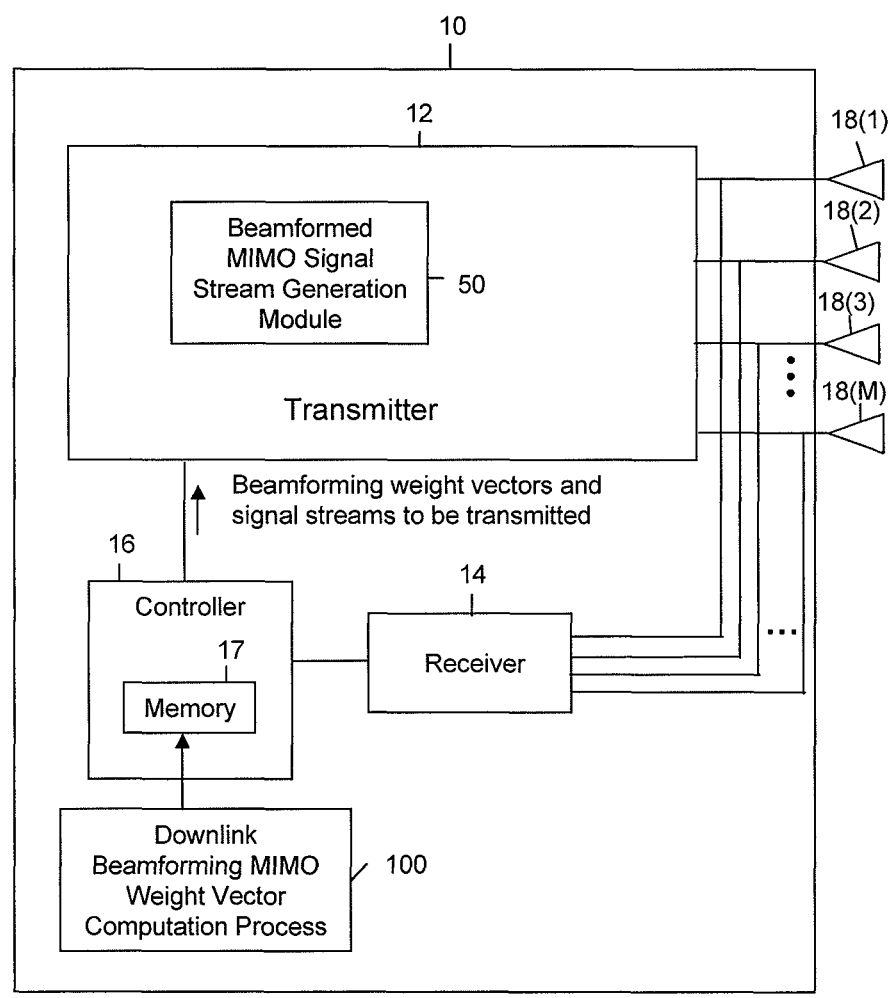
FIG. 2 illustrates an example of a block diagram of a first wireless communication device (e.g., a base station) configured to perform a downlink beamforming MIMO weight vector computation process to support bi-directional beamforming MIMO communication.
Figure 3:
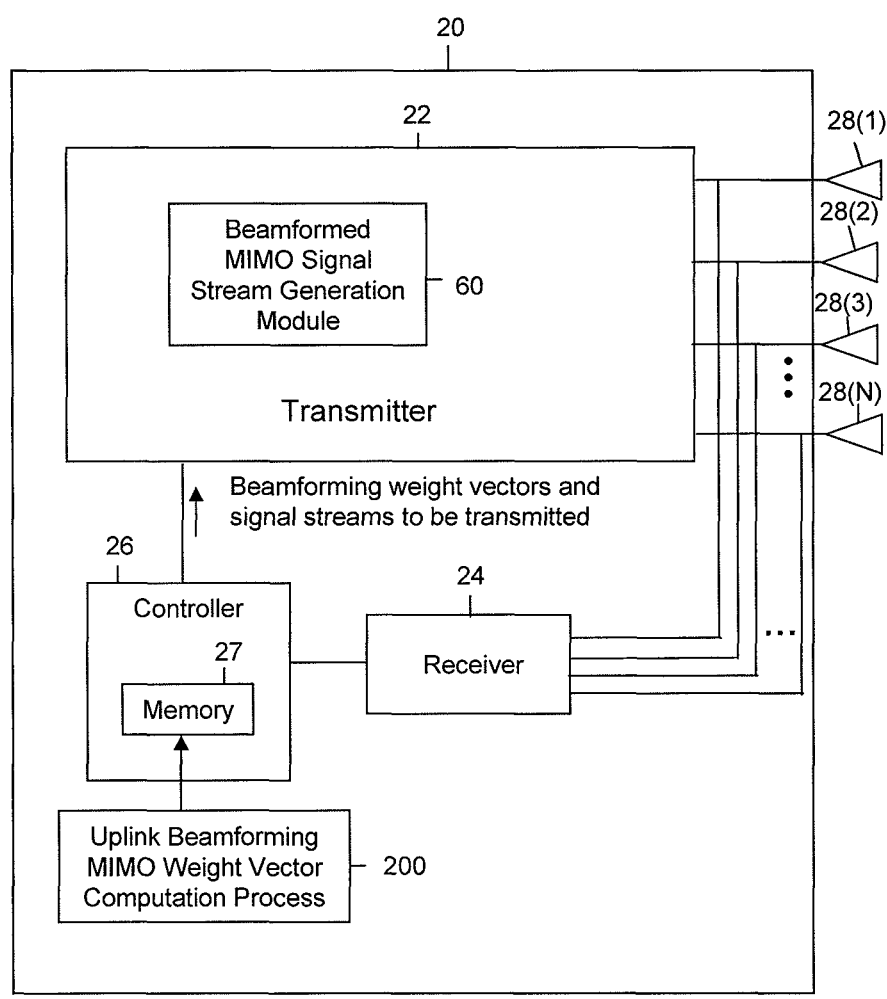
FIG. 3 illustrates an example of a block diagram of a second wireless communication device (e.g., a mobile station) configured to perform an uplink beamforming MIMO weight vector computation process to support bi-directional beamforming MIMO communication.

Turning to FIGS. 2 and 3, examples of block diagrams of the BS 10 and MS 20 are now described. Referring first to FIG. 2, the BS 10 comprises a transmitter (block) 12 (herein also referred to as a first transmitter), a receiver (block) 14 (herein also referred to as a first receiver and a controller 16 (herein also referred to as a first controller). The controller 16 supplies data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits, e.g., Mt transmitter circuits, which supply respective upconverted signals to corresponding ones of a plurality of antennas 18(1)-18(M) for transmission. For simplicity, these individual transmitter circuits are not shown in FIG. 2. The transmitter 12 comprises a beamformed MIMO signal stream generation module 50 that applies respective ones of downlink beamforming weight vectors $\vec{w}_{D1}, \vec{w}_{D2}, \ldots, \vec{w}_{DMt'}$ to corresponding ones of a plurality of signal streams to be simultaneously beamformed transmitted via the antennas 18(1)-18(M). The meaning of Mt' is described hereinafter in connection with FIGS. 4 and 5.

The receiver 14 receives the signals detected by each of the antennas 18(1)-18(M) and supplies corresponding antenna-specific receive signals to controller 16. The receiver 14 comprises a plurality of individual receiver circuits, e.g., Mr receiver circuits, each of which outputs a receive signal associated with a signal detected by a respective one of the plurality of antennas 18(1)-18(M). For simplicity, these individual receiver circuits are not shown in FIG. 2.

The controller 16 comprises a memory 17 or other data storage block that stores data used for the techniques described herein. The memory 17 may be separate or part of the controller 16. In addition, logic instructions for performing a downlink beamforming MIMO weight vector computation process 100 may be stored in the memory 17 for execution by the controller 16. The process 100 generates the downlink beamforming weight vectors $\vec{w}_{D1}, \vec{w}_{D2}, \ldots, \vec{w}_{DMt'}$ for use by the beamformed MIMO signal stream(s) generation module 50 in applying the downlink beamforming weight vectors to corresponding ones of the downlink signal streams to be transmitted.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the beamformed MIMO signal stream generation module 50 and the downlink beamforming MIMO weight vector computation process 100 may be performed by the same logic component, e.g., the controller 16, which may also perform modem functions.

Referring now to FIG. 3, the MS 20 comprises a transmitter (block) 22 (herein also referred to as a second transmitter), a receiver (block) 24 (herein also referred to as a second receiver) and a controller 26 (herein also referred to as a second controller), much like the BS 10. The controller 26 supplies data to the transmitter 22 to be transmitted and processes signals received by the receiver 14. In addition, the controller 26 performs other transmit and receive control functionality. Part of the functions of the transmitter 22 and receiver 24 may be implemented in a modem and other parts of the transmitter 12 and receiver 14 may be implemented in radio transmitter and radio transceiver circuits.

The transmitter 22 may comprise individual transmitter circuits, e.g., Nt transmitter circuits, which supply respective upconverted signals to corresponding ones of a plurality of antennas 28(1)-28(N) for transmission. For simplicity, these individual transmitter circuits are not shown in FIG. 3. The transmitter 22 comprises a beamformed MIMO signal stream generation module 60 that applies respective ones of uplink beamforming weight vectors $\vec{w}_{D1}, \vec{w}_{D2}, \ldots, \vec{w}_{DNt'}$ to corresponding ones of a plurality of signal streams to be transmitted via the antennas 28(1)-28(N). The meaning of Nt' is described hereinafter in connection with FIG. 6.

The receiver 24 receives the signals detected by each of the antennas 28(1)-28(N) and supplies corresponding antenna-specific receive signals to controller 26. The receiver 24 comprises a plurality of individual receiver circuits, e.g., Nr receiver circuits, each of which outputs a receive signal associated with a signal detected by a respective one of the plurality of antennas 28(1)-28(N). For simplicity, these individual receiver circuits are not shown in FIG. 3.

The controller 26 comprises a memory 27 or other data storage block that stores data used for the techniques described herein. The memory 27 may be separate or part of the controller 26. Logic instructions for performing an uplink beamforming MIMO weight vector computation process 200 may be stored in the memory 27 for execution by the controller 16. The process 200 generates the downlink beamforming weight vectors $\vec{w}_{U1}, \vec{w}_{U2}, \ldots, \vec{w}_{UNt'}$ for use by the beamformed MIMO signal stream(s) generation module 60 in applying the uplink beamforming weight vectors to corresponding ones of the uplink signal streams to be transmitted.

The functions of the controller 26 may be implemented by logic encoded in one or more tangible media (e.g., embedded logic such as an application specific integrated circuit, digital signal processor instructions, software that is executed by a processor, etc.), wherein the memory 27 stores data used for the computations described herein (and/or to store software or processor instructions that are executed to carry out the computations described herein). Thus, the process 200 may be implemented with fixed logic or programmable logic (e.g., software/computer instructions executed by a processor). Moreover, the functions of the beamforming signal stream generation module 60 and the uplink beamforming MIMO weight vector computation process 200 may be performed by the same logic component, e.g., the controller 26, which may also perform modem functions.

Figure 4:
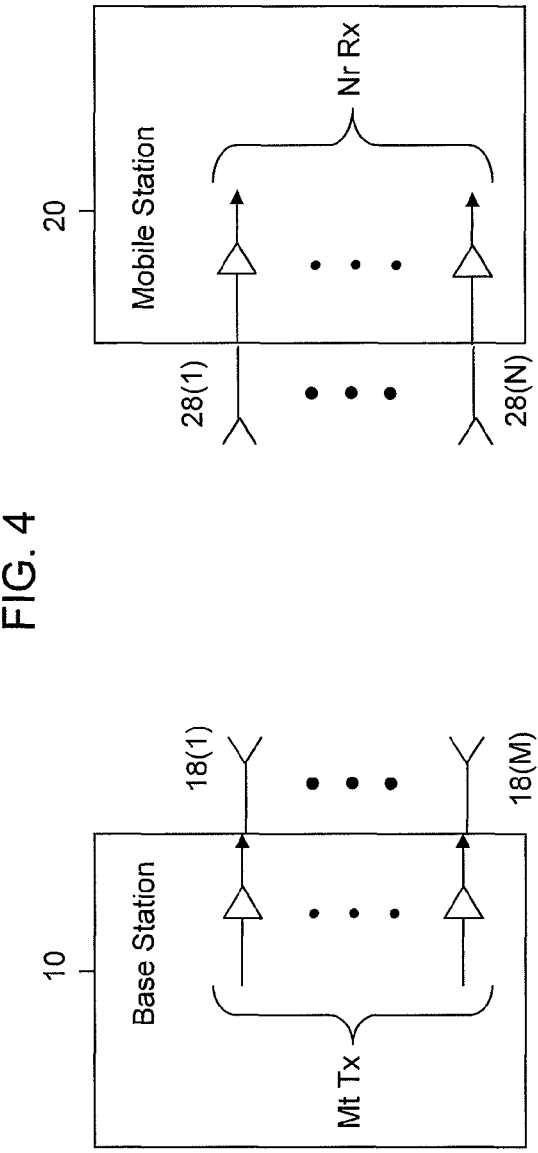
FIGS. 4 and 5 are block diagrams depicting an example of a downlink beamforming MIMO transmission from the first device to the second device.
Figure 5:
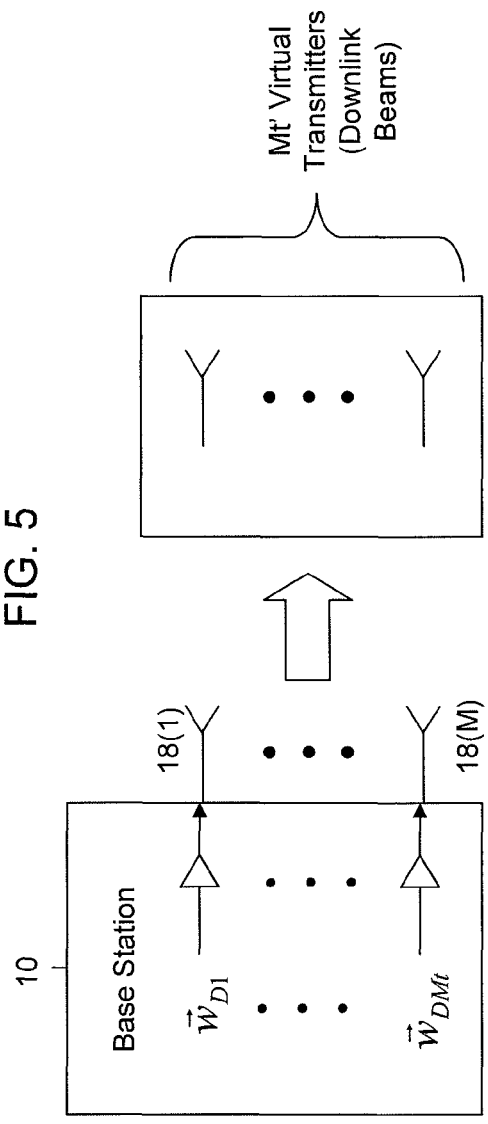

Turning now to FIGS. 4 and 5, the downlink beamformed MIMO path is described. The downlink beamformed MIMO path is from Mt transmit paths of the BS 10 to Nr receive paths of the MS 20. The BS 10 generates Mt' virtual transmitters corresponding to Mt' beamformed signal streams or downlink beams formed from the Mt transmit paths, where Mt'<=Mt. The number of beamformed signal streams that the BS 10 can simultaneously transmit to the MS 20 depends on the number of antennas M of the BS 10 and the number of antennas N of the MS 20, where in general Mt'<=min(M,N). Thus, in one example, Mt'=Nr, which may be equal to N if the MS 20 has an equal number of receivers and antennas.

The Mt' virtual transmitters (downlink beams) are formed by applying Mt' downlink beamforming weight vectors $\vec{w}_{D1}$, $\vec{w}_{D2}, \ldots, \vec{w}_{DMt'}$ to Mt' downlink signal streams. Each downlink beamforming weight vector is a vector of dimension M, corresponding to the number of antennas of the BS 10. The downlink beamforming weight vectors $\vec{w}_{D1}, \vec{w}_{D2}, \ldots, \vec{w}_{DMt'}$ are computed from uplink spatial signatures $\{s_{U1}, s_{U2}, \ldots, s_{UNt}\}$, where $s_{Ui}\{i=1, 2, \ldots, Nt\}$ is a column vector of dimension Mr and corresponds to the signal transmitted from the $i^{th}$ antenna of the MS 20 and received at each of the antennas 18(1)-18(M) of the BS 10.

There are numerous computation techniques known in the art to compute the Mt' downlink beamforming weight vectors $\vec{w}_{D1}, \vec{w}_{D2}, \ldots, \vec{w}_{DMt'}$ from the received uplink signals. For example, the downlink beamforming weight vectors may be computed using an eigenvalue scheme described as follows.

First, the controller 16 of the BS 10 is programmed or otherwise configured to compute a signal covariance matrix:

$$\text{cov} = \sum_i^{Nt} \sum_j s_{ui}(j) \cdot s_{ui}^H(j) \tag{1}$$

where the summation over index j is intended to mean that the covariance matrix is computed with all received uplink signals over a certain scope, such as period of time (e.g., symbols) and/or frequency subcarriers and/or codes. The downlink beamforming weight vectors can be readily computed from the covariance matrix (cov). For example, the first Mt' dominant eigenvectors may be computed through singular value decomposition of the covariance matrix, where the Mt' dominant eigenvectors are used as the Mt' downlink beamforming weight vectors $\vec{w}_{D1}, \vec{w}_{D2}, \ldots, \vec{w}_{DMt'}$.

In the computation of equation (1) it is not necessary for the first summation (over i) to be made over all N of the antennas or Nt of the transmitters of the MS 20. As explained hereinafter in connection with FIG. 6, when the MS 20 is also performing uplink beamforming MIMO transmissions to the BS 10, the MS 20 generates Nt' uplink beams via the N antennas of the MS 20. The BS 10 effectively receives Nt' uplink beams (beamformed signal streams) from the MS 20. Consequently, the summation of equation (1) can be modified to go from 1 to Nt' as:

$$\text{cov} = \sum_i^{Nt'} \sum_j s_{ui}(j) \cdot s_{ui}^H(j). \tag{2}$$

In the extreme case when Nt'=1, the uplink signal is a single beamformed stream (single beam).

Figure 6:
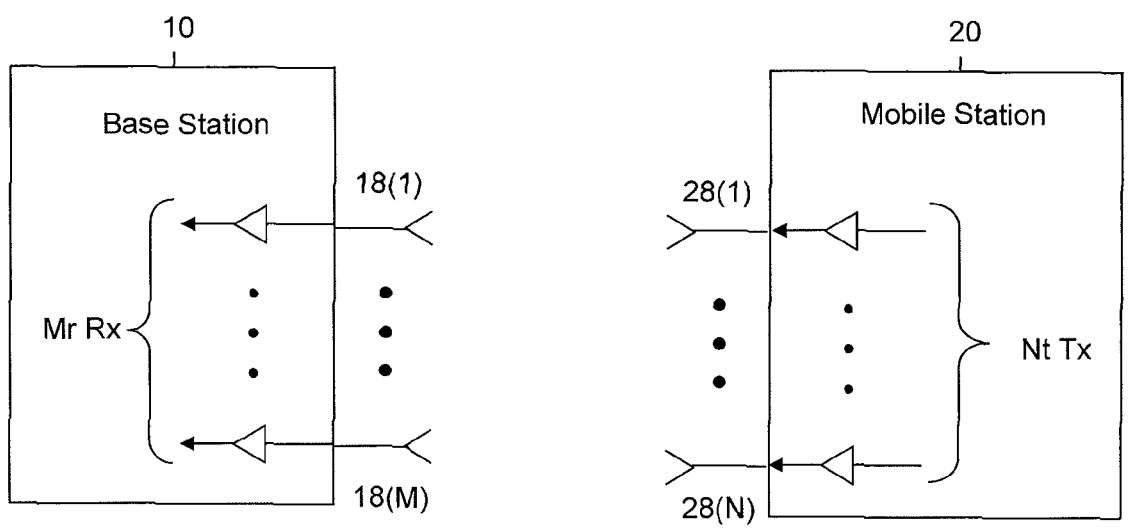
FIG. 6 is a block diagram depicting an example of an uplink beamforming MIMO transmission from the second device to the first device.

Turning to FIG. 6, the uplink beamformed MIMO path is described. The uplink beamformed MIMO path is from Nt transmit paths of the MS 20 to Mr receive paths of the BS 10. The MS 20 generates Nt' virtual transmitters corresponding to Nt' uplink beams or beamformed signal streams, from the Nt transmit paths, where Nt'<=Nt. As in the downlink case, the number of uplink beamformed signal streams that the MS 20 can transmit to the BS 10 depends on the number of BS antennas and number of MS antennas such that Nt'<=min(M, N). In one example Nt'=Mr, which may be equal to M if the BS 10 has an equal number of receivers and antennas.

The generation of the Nt virtual transmitters (beamformed signal streams) are formed by applying Nt' uplink beamforming weight vectors $\vec{w}_{U1}, \vec{w}_{U2}, \ldots, \vec{w}_{UNt'}$ to Nt' uplink signal streams. Each uplink beamforming weight vector is a vector of dimension N, corresponding to the number of antennas of the MS 20. The uplink beamforming weight vectors $\vec{w}_{U1}$, $\vec{w}_{US}, \ldots, \vec{w}_{UNt'}$ may be computed from downlink beamformed signals received from the BS 10 using techniques similar to those described above in connection with the computation of the downlink beamforming weight vectors depicted by equations (1) and (2).

There are some unique properties of the downlink that can be exploited to better facilitate the computation of the uplink beamforming weight vectors. In addition to using the received downlink beamformed data streams (which are by their nature "unicast"), the MS 20 can also use received broadcast signals transmitted by the BS 10. A broadcast signal is a signal that is not specifically for a particular destination device, and its intended coverage is for a region where multiple MS's may receive it. The broadcast signals usually contain the system parameter information and facilitate system frequency/timing acquisition for the MS's in the coverage area of a BS. Examples of such broadcast signals are the preamble signal in a WiMAX formatted frame and a pilot signal in the IS95 code division multiple access (CDMA) standard.

Thus, the MS 20 can use the downlink beamformed signal that the BS 10 sends specifically to it, or the downlink broadcast signals, or both, to calculate the uplink beamform weight vectors it uses when making a beamformed MIMO transmission back to the BS 10.

There are certain benefits for MS to use the broadcast signal for the uplink beamforming weight vector computation. First, the downlink broadcast signal is continuously (at some time interval) being transmitted within a coverage area such that the MS 20 can update its uplink beamforming weight vectors continuously as broadcast signals are received over time. Another benefit is that BS 10 usually allocates more power to broadcast signals than to traffic signals because a broadcast message contains critical system information and its reliable reception needs to be ensured. This means that the broadcast signal is more reliable and, in many cases, is less susceptible to interference. Moreover, in some circumstances the broadcast signal is the only signal that the MS can use for its uplink beamforming weight vector computation, particularly at the time when a MS is initially establishing communication with the BS and has not yet received a unicast beamformed transmission from the BS.

Figure 7:
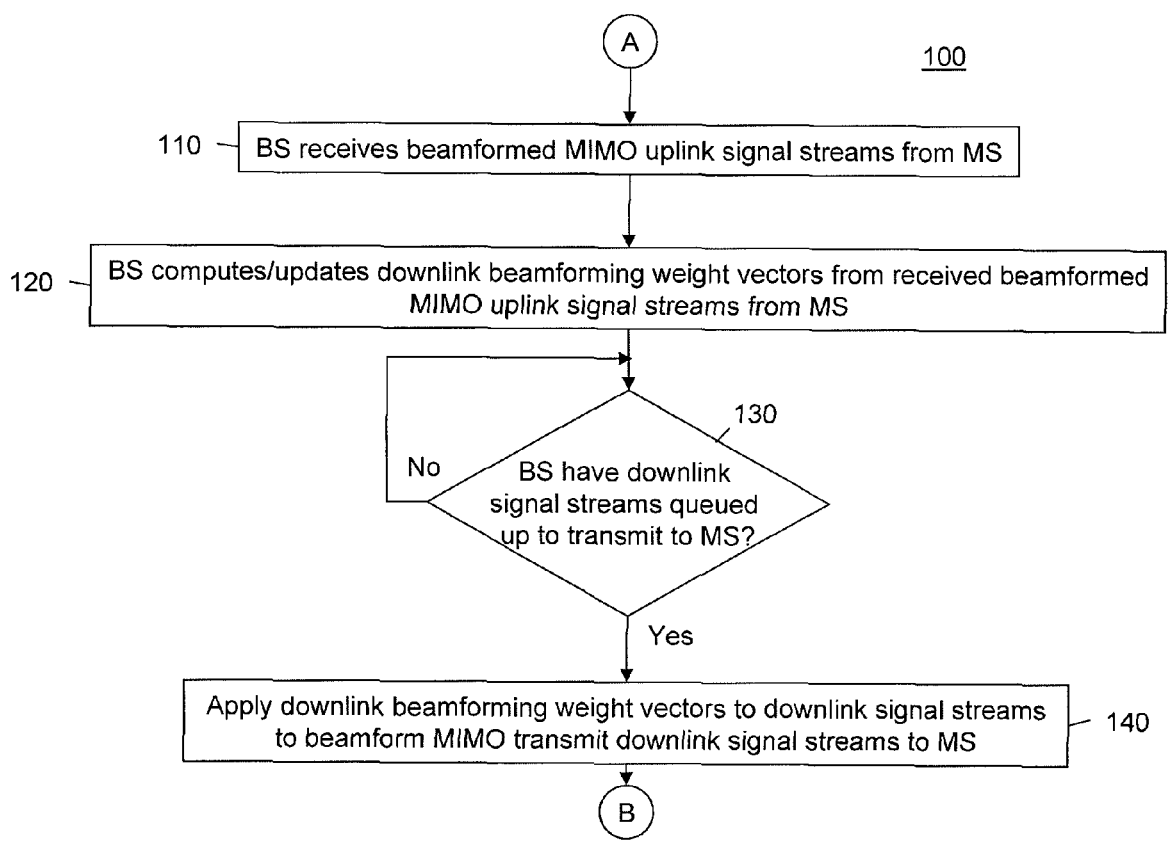
FIG. 7 is an example of a flow chart depicting the downlink beamforming MIMO weight vector computation process employed by the first communication device.

Turning now to the flow chart of FIG. 7, operation of the downlink beamforming weight vector computation process 100 is described. The process 100 interacts with, and depends on, the uplink beamforming weight computation process 200 described hereinafter in conjunction with FIG. 8. At 110, the BS 10 receives a transmission of beamformed MIMO uplink signal streams from the MS 20. At 120, the BS 10 computes or updates already computed values for downlink beamforming weight vectors from signals resulting from reception at the plurality of antennas 18(1)-18(M) of the plurality of uplink signal streams beamformed by the MS 20. The techniques described above using the covariance matrix and eigenvector computations may be employed at 120 in computing values for the downlink beamforming weight vectors. That is, a signal covariance matrix may be computed from signals resulting from detection of the plurality of uplink signal streams at the plurality of antennas 18(1)-18(M) of the BS 10. Said another way, the signal covariance matrix is computed from uplink spatial signatures that are derived from reception at the plurality of antennas 18(i)-18(M) of the BS 10 of uplink beams formed from application of the plurality of uplink beamforming weight vectors to the plurality of uplink signal streams at the MS 20 (as described hereinafter in connection with FIG. 8). The plurality of downlink beamforming weight vectors are then computed from the signal covariance matrix.

At 130, the BS 10 determines whether it has downlink signal streams in its queue to transmit to the MS 20. When data is queued up at the BS 10 for transmission to the MS 20, then at 140 the downlink signal streams and downlink beamforming weight vectors are supplied to the transmitter in the BS 10 which applies the plurality of downlink beamforming weight vectors to the plurality of the downlink signal streams for simultaneous beamform transmission of the plurality of downlink signal streams via the plurality of antennas 18(1)-18(M) of the BS 10 to the MS 20.

As indicated by the flow chart element "A" in FIG. 7, the process 100 is initiated any time the BS 10 receives beamformed MIMO uplink signal streams from the MS 20, which occurs at 250 of process 200 in the flowchart of FIG. 8. Likewise, after the BS 10 makes a beamformed MIMO transmission at 140 to the MS 20, this will trigger execution of certain steps in process 200 at the MS 20 in FIG. 8 as indicated by the flow chart element "B" in FIG. 7.

Turning now to FIG. 8, uplink beamforming weight vector computation process 200 is now described. There are two ways for the process 200 to be invoked in the MS 20. The process 200 can be invoked at 210 when the MS 20 receives a downlink broadcast signal transmitted by the BS 10. At 220, the MS 20 computes or updates already computed values for the uplink beamforming weight vectors from signals resulting from detection of the downlink broadcast signal at the plurality of antennas 28(1)-28(N) of the MS 20. The computation at 220 may be repeated at each of multiple instances of reception of broadcast signals at the MS 20. As indicated above, an advantage to using the reception of downlink broadcast signals to compute uplink beamforming weight vector is that in many system implementations the downlink broadcast signal is transmitted with a higher power than a power used to transmit unicast signals (such as the power used when the BS 10 transmits plurality of downlink signal streams to the MS 20).

The process 200 can also be invoked at 230 when the MS 20 receives a downlink unicast beamformed MIMO signal stream transmission sent by the BS 10. When such a unicast transmission is received by the MS 20, then at 230, the MS 20 computes or updates already computed values for the uplink beamforming weight vectors from signals resulting from reception at the plurality of antennas 28(1)-28(N) of the MS 20 of plurality of (unicast or directed) downlink signal streams beamformed by the BS 10.

At 240, a determination is made as to whether the MS 20 has uplink signal streams queued up for transmission to the BS 10. When there is a sufficient queue of uplink signal streams to be transmitted to the BS 10, then at 250, the uplink signal streams and uplink beamforming weight vectors are supplied to the transmitter in the MS 20, which applies the plurality of uplink beamforming weight vectors to a plurality of uplink signal streams for simultaneous beamform transmission via the plurality of antennas 28(1)-28(N) of the MS 20 to the BS 10. After the uplink transmission occurs, then the process 100 begins again as indicated by the flow chart element labeled "A" in FIG. 8.

The techniques described above using the covariance matrix and eigenvector computations may be employed at 220 and 230 in computing values for the uplink beamforming weight vectors. That is, a signal covariance matrix is computed from signals resulting from reception of the plurality of downlink signal streams at the plurality of antennas 28(1)-28(N) of the MS 20, and the plurality of uplink beamforming weight vectors are computed from the signal covariance matrix. Moreover, the signal covariance matrix is computed from downlink spatial signatures that are derived from reception at the plurality of antennas 28(1)-28(N) of the MS 20 of downlink beams formed from application of the plurality of downlink beamforming weights to the plurality of downlink signal streams at the BS 20.

As depicted by the flowcharts of FIGS. 7 and 8, the processes 100 and 200 depend on each and continue to compute updates to the beamforming weight vectors in the respective devices as the devices continue to make beamformed MIMO transmission to each other. Thus, the devices will continue to adjust their beamforming weight vectors according to changes in the channel that are occurring as a result of movement in the positions of the BS and MS relatively to each other, movement of obstructions between the BS and MS, etc.

Described herein is a system, processes and devices configured to enable bi-directional beamforming MIMO communication simultaneously between two devices. The operations of the beamforming MIMO link in one direction depend on and affect the operations of the beamforming MIMO link in the other direction.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a first device comprising a first plurality of antennas:
receiving at the first plurality of antennas a plurality of uplink signal streams that were beamformed by a second device and transmitted to the first device;
computing a plurality of downlink beamforming weight vectors from signals resulting from reception at the first plurality of uplink signal streams that were beamformed by the second device and received at the first plurality of antennas
applying the plurality of downlink beamforming weight vectors to a plurality of downlink signal streams for simultaneous beamform transmission via the first plurality of antennas of the first device to the second device; and
transmitting a non-beamformed downlink broadcast signal;
at the second device comprising a second plurality of antennas:
receiving at the second plurality of antennas the plurality of downlink signal streams that were beamformed by the first device;
detecting the non-beamformed downlink broadcast signal transmitted by the first device;
computing a plurality of uplink beamforming weight vectors based on the plurality of downlink signal streams beamformed by the first device and transmitted to the second device and based on the detected non-beamformed downlink broadcast signal detected by the second device; and
applying the plurality of uplink beamforming weight vectors to a plurality of uplink signal streams for simultaneous beamform transmission via the second plurality of antennas of the second device to the first device;
wherein the first device repeats the computing each time a new plurality of uplink signal streams are received at the first plurality of antennas of the first device from the second device to update the plurality of beamforming weight vectors used by the first device for application to the plurality of downlink signal streams to be transmitted, and wherein the second device repeats the computing each time the second device receives a new plurality of downlink signal streams from the first device to update the plurality of beamforming weight vectors used by the second device for application to the plurality of uplink signal streams to be transmitted.

2. The method of claim 1, wherein comprises transmitting the non-beamformed downlink broadcast signal comprises transmitting the non-beamformed downlink broadcast signal with a higher power than a power used to transmit beamformed downlink signal streams to the second device.

3. The method of claim 1, wherein computing the plurality of downlink beamforming weight vectors comprises computing a signal covariance matrix from signals resulting from reception of the plurality of uplink signal streams at the first plurality of antennas of the first device, and computing the plurality of downlink beamforming weight vectors from the signal covariance matrix.

4. The method of claim 3, wherein computing the signal covariance matrix is based on uplink spatial signatures derived from reception at the first plurality of antennas of the first device based on uplink beams formed from application of the plurality of uplink beamforming weight vectors to the plurality of uplink signal streams at the second device.

5. The method of claim 1, wherein computing the plurality of uplink beamforming weight vectors comprises computing a signal covariance matrix from signals resulting from reception of the plurality of downlink signal streams at the second plurality of antennas of the second device, and computing the plurality of uplink beamforming weight vectors from the signal covariance matrix.

6. The method of claim 5, wherein computing the signal covariance matrix is based on downlink spatial signatures derived from reception at the second plurality of antennas of the second device based on downlink beams formed from application of the plurality of downlink beamforming weight vectors to the plurality of downlink signal streams at the first device.

7. The method of claim 1, further comprising:
determining whether there are uplink signal streams in a queue; and
if there are uplink signal streams in the queue, then performing the computing and applying operations in the second device and otherwise not performing the computing and applying operations.

8. An apparatus comprising:
a plurality of antennas;
a transmitter coupled to the plurality of antennas and configured to produce individual transmit signals for transmission by respective ones of the plurality of antennas;
a receiver coupled to the plurality of antennas and configured to produce individual receive signals from signals received by respective ones of the plurality of antennas; and
a controller coupled to the receiver and transmitter, wherein the controller is configured to:
compute a plurality of beamforming weight vectors from signals based on signals resulting from reception at the plurality of signal streams that were beamformed at another device by applying transmit beamforming weight vectors and transmitted from the other device and based on signals resulting from reception of a non-beamformed broadcast signal transmitted by the other device and received at the plurality of antennas;
apply the plurality of beamforming weight vectors to a plurality of signal streams for simultaneous beamform transmission via the plurality of antennas to the other device; and
repeat the compute operation each time a new plurality of signal streams are received at the plurality of antennas from the other device to update the plurality of beamforming weight vectors used for application to the plurality of signal streams to be transmitted to the other device.

9. The apparatus of claim 8, wherein the controller is configured to compute the plurality of beamforming weight vectors by computing a signal covariance matrix from signals resulting from reception of the plurality of signal streams at the plurality of antennas, and computing the plurality of beamforming weight vectors from the signal covariance matrix.

10. The apparatus of claim 8, wherein the controller is configured to compute the plurality of beamforming weight vectors and apply the plurality of beamforming weight vectors to the plurality of signal streams when there are uplink signal streams in a queue and otherwise the controller does not compute the plurality of beamforming weight vectors and does not apply the plurality of beamforming weight vectors to the plurality of signal streams.

11. A non-transitory computer readable storage media encoded with instructions for execution by a processor and when executed cause the processor to:
  compute a plurality of beamforming weight vectors from signals resulting from reception of a plurality of signal streams that were beamformed from at another device by application of transmit beamforming weight vectors and transmitted from the other device and based on signals resulting from reception of a non-beamformed broadcast signal transmitted by the other device and received at the plurality of antennas
  apply the plurality of beamforming weight vectors to a plurality of signal streams for simultaneous beamform transmission via the plurality of antennas to the other device; and
  repeat the compute operation each time the plurality of signal streams are received at the plurality of antennas from the other device to update the plurality of beamforming weight vectors used for application to the plurality of signal streams to be transmitted to the other device.

12. The non-transitory computer readable storage media of claim 11, wherein the instructions that cause the processor to compute the plurality of beamforming weight vectors comprise instructions that cause the processor to compute a signal covariance matrix from signals resulting from reception of the plurality of signal streams at the plurality of antennas to compute the plurality of beamforming weight vectors from the signal covariance matrix.

13. The non-transitory computer readable medium of claim 11, wherein the instructions that cause the processor to compute the plurality of beamforming weight vectors comprise instructions that cause the processor to:
  compute the beamforming weight vectors and apply the beamforming weight vectors to uplink signal streams when there are uplink signal streams in a queue, and otherwise not computing the beamforming weight vectors and not applying the beamforming weight vectors to the uplink signal streams.

14. A system comprising:
  a first wireless communication device and a second wireless communication device;
  the first wireless communication device comprising:
    a first plurality of antennas;
    a first transmitter coupled to the first plurality of antennas and configured to produce individual transmit signals for transmission by respective ones of the first plurality of antennas;
    a first receiver coupled to the first plurality of antennas and configured to produce individual receive signals from signals received by respective ones of the first plurality of antennas; and
    a first controller coupled to the first receiver and first transmitter, wherein the first controller is configured to:
      compute a plurality of downlink beamforming weight vectors from signals resulting from reception of a first plurality of signal streams beamformed by the second wireless communication device and received at the first plurality of antennas
      apply the plurality of downlink beamforming weight vectors to a corresponding plurality of downlink signal streams for simultaneous beamforming transmission via the first plurality of antennas of the first wireless communication device to the second wireless communication device;
      repeat the compute operation each time uplink signal streams are received from the second wireless communication device to update the plurality of beamforming weight vectors used for application to the plurality of downlink signal streams to be transmitted from the first wireless communication device to the second wireless communication device; and
      generate a non-beamformed downlink broadcast signal for transmission by the first transmitter;
  the second wireless communication device comprising:
    a second plurality of antennas;
    a second transmitter coupled to the second plurality of antennas and configured to produce individual transmit signals for transmission by respective ones of the second plurality of antennas;
    a second receiver coupled to the second plurality of antennas and configured to produce individual receive signals from signals received by respective ones of the second plurality of antennas; and
    a second controller coupled to the second receiver and the second transmitter, wherein the second controller is configured to:
      compute a plurality of uplink beamforming weight vectors based on the plurality of downlink signal streams beamformed by the first wireless communication device and received at the second plurality of antennas and based on signals resulting from reception of the non-beamformed downlink broadcast signal transmitted by the first wireless communication device and received at the second plurality antennas;
      apply the plurality of uplink beamforming weight vectors to a corresponding plurality of uplink signal streams for simultaneous beamforming transmission via the second plurality of antennas of the second wireless communication device to the first wireless communication device; and
      repeat the compute operation each time new downlink signal streams are received from the first wireless communication device to update the plurality of beamforming weight vectors used for application to the plurality of uplink signal streams to be transmitted from the second wireless communication device to the first wireless communication device.

15. The system of claim 14, wherein the first controller is configured to compute the plurality of downlink beamforming weight vectors by computing a signal covariance matrix from signals resulting from reception of the plurality of uplink signal streams at the first plurality of antennas and to compute the plurality of downlink beamforming weight vectors from the signal covariance matrix.

16. The system of claim 14, wherein the second controller is configured to compute the plurality of uplink beamforming weight vectors by computing a signal covariance matrix from signals resulting from reception of the plurality of downlink signal streams at the second plurality of antennas and to compute the plurality of uplink beamforming weight vectors from the signal covariance matrix.

17. The system of claim 14, wherein the first transmitter of the first wireless communication device is configured to transmit the non-beamformed downlink broadcast signal with a higher power than a power used to transmit the beamformed downlink signal streams to the second wireless communication device.

18. The system of claim 14, wherein the second controller of the second wireless communications device is further configured to compute and apply the uplink beamforming weight vectors if there are uplink signal streams in a queue and otherwise does not compute and apply the uplink beamforming weight vectors.

* * * * *